United States Patent
Rhode et al.

(10) Patent No.: US 8,909,426 B2
(45) Date of Patent: Dec. 9, 2014

(54) TRAILER PATH CURVATURE CONTROL FOR TRAILER BACKUP ASSIST

(75) Inventors: Douglas Scott Rhode, Farmington Hills, MI (US); David Dean Smit, Ann Arbor, MI (US); Erick Michael Lavoie, Dearborn, MI (US); Martin Fitzpatrick Frey, Saline, MI (US); Thomas Edward Pilutti, Ann Arbor, MI (US); Taehyun Shim, Ann Arbor, MI (US); Matt Y. Rupp, Canton, MI (US); Roger Arnold Trombley, Ann Arbor, MI (US)

(73) Assignees: Ford Global Technologies, Dearborn, MI (US); The Regents of The University of Michigan, Ann Arbor, MI (US)

( * ) Notice: Subject to any disclaimer, the term of this patent is extended or adjusted under 35 U.S.C. 154(b) by 409 days.

(21) Appl. No.: 13/336,060

(22) Filed: Dec. 23, 2011

(65) Prior Publication Data

US 2012/0271515 A1     Oct. 25, 2012

Related U.S. Application Data

(60) Provisional application No. 61/477,132, filed on Apr. 19, 2011.

(51) Int. Cl.
*G06F 19/00* (2011.01)
*B62D 13/06* (2006.01)

(52) U.S. Cl.
USPC .............................. 701/41; 280/426; 280/448

(58) Field of Classification Search
USPC ................. 701/41, 36; 280/426, 448
See application file for complete search history.

(56) References Cited

U.S. PATENT DOCUMENTS

| | | | | |
|---|---|---|---|---|
| 3,542,390 A | * | 11/1970 | Fikse | 280/81.6 |
| 3,860,257 A | * | 1/1975 | Mesly | 280/81.6 |
| 4,277,804 A | | 7/1981 | Robison | |
| 4,735,432 A | * | 4/1988 | Brown | 280/404 |

(Continued)

FOREIGN PATENT DOCUMENTS

| | | |
|---|---|---|
| DE | 3923676 A1 | 1/1991 |
| DE | 19526702 A1 | 2/1997 |

(Continued)

OTHER PUBLICATIONS

Back Driving Assistant for Passenger Cars with Trailer (SAE Int'l), 2006.

(Continued)

*Primary Examiner* — Ronnie Mancho
(74) *Attorney, Agent, or Firm* — Angela M. Brunetti; Raymond Coppiellie

(57) ABSTRACT

A vehicle has a trailer backup steering input apparatus, a trailer backup assist control module coupled to the a trailer backup steering input apparatus, and an electric power assist steering system coupled to the trailer backup assist control module and. The trailer backup steering input apparatus is configured for outputting a trailer path curvature signal approximating a desired curvature for a path of travel of a trailer towably coupled to the vehicle. The trailer backup assist control module is configured for determining vehicle steering information as a function of the trailer path curvature signa. The electric power assist steering system is configured for controlling steering of steered wheels of the vehicle as a function of the vehicle steering information.

40 Claims, 6 Drawing Sheets

(56) References Cited

U.S. PATENT DOCUMENTS

| | | | |
|---|---|---|---|
| 4,752,080 A * | 6/1988 | Rogers | 280/426 |
| 4,848,499 A | 7/1989 | Martinet et al. | |
| 5,246,242 A * | 9/1993 | Penzotti | 280/426 |
| 5,247,442 A | 9/1993 | Kendall | |
| 5,579,228 A | 11/1996 | Kimbrough et al. | |
| 6,494,476 B2 | 12/2002 | Masters et al. | |
| 6,854,557 B1 | 2/2005 | Deng | |
| 7,219,913 B2 * | 5/2007 | Atley | 280/426 |
| 7,225,891 B2 | 6/2007 | Gehring | |
| 7,715,953 B2 | 5/2010 | Shepard | |
| 7,932,623 B2 | 4/2011 | Burlak et al. | |
| 2004/0215374 A1 | 10/2004 | Shepard | |
| 2005/0206225 A1 | 9/2005 | Offerle et al. | |
| 2005/0206229 A1 | 9/2005 | Lu et al. | |
| 2005/0209763 A1 | 9/2005 | Offerle et al. | |
| 2006/0103511 A1 | 5/2006 | Lee et al. | |
| 2007/0027581 A1 | 2/2007 | Bauer et al. | |
| 2007/0198190 A1 | 8/2007 | Bauer et al. | |
| 2007/0252359 A1 | 11/2007 | Wishart et al. | |
| 2008/0312792 A1 | 12/2008 | Dechamp | |
| 2009/0093928 A1 | 4/2009 | Getman et al. | |
| 2009/0198425 A1 | 8/2009 | Englert | |
| 2010/0152989 A1 | 6/2010 | Smith et al. | |
| 2011/0257860 A1 | 10/2011 | Getman et al. | |
| 2012/0041659 A1 | 2/2012 | Greene | |
| 2012/0185131 A1 | 7/2012 | Headley | |
| 2012/0200706 A1 | 8/2012 | Greenwood et al. | |
| 2012/0271512 A1 * | 10/2012 | Rupp et al. | 701/41 |
| 2012/0316732 A1 | 12/2012 | Auer et al. | |
| 2013/0024064 A1 | 1/2013 | Shepard et al. | |

FOREIGN PATENT DOCUMENTS

| | | |
|---|---|---|
| DE | 102005043467 | 3/2007 |
| DE | 102005043468 | 3/2007 |
| DE | 102006002294 | 7/2007 |
| DE | 102006035021 | 1/2008 |
| DE | 102007029413 | 1/2009 |
| DE | 102008043675 | 5/2010 |
| DE | 102009007990 | 8/2010 |
| DE | 102009012253 | 9/2010 |
| DE | 102008004158 B4 | 10/2011 |
| DE | 102008004159 B4 | 10/2011 |
| DE | 102008004160 A1 | 10/2011 |
| DE | 102008004160 B4 | 10/2011 |
| DE | 102010021052 A1 | 11/2011 |
| DE | 102010029184 | 11/2011 |
| EP | 0849144 A2 | 6/1996 |
| EP | 1810913 | 7/2007 |
| EP | 2388180 A2 | 11/2011 |
| FR | 2515379 A1 | 10/1981 |
| GB | 2398049 A | 8/2004 |
| WO | WO 8503263 A1 | 8/1985 |
| WO | WO 00/44605 A1 | 8/2000 |

OTHER PUBLICATIONS

IEEE—Backing Up a Truck-Trailer with Suboptimal Distance Trajectories, Sep. 1996.

IEEE—Control of a Robot-Trailer System Using a Single Non-Collocated Sensor, Jul. 4, 2013.

IEEE—Feedback Control Scheme or Reversing a Truck and Trailer Vehicle, Dec. 2001.

Experiments in Autonomous Reversing of a Tractor-Trailer System, Dec. 2007.

Robust Trajectory Tracking for a Reversing Tractor-Trailer System (Draft), Mar. 2008.

Optionally Unmanned Ground Systems for Any Steering-Wheel Based Vehicle, 2009.

A Simple Tractor-Trailer Backing Control Law for Path Following Oct. 22, 2010 http:-ieeexplore.ieee.org-xpl-freeabs_all.jsp?arnumber=5650489.

Backing-Up Maneuvers of Autonomous Tractor-Trailer Vehicles Using the Qualitative Theory of Nonlinear Dynamical Systems Jan. 1, 2009 http:-portal.acm.org-citation.cfm?id=1482340.

Trajectory Tracking Control of a Car-Trailer System May 1997 http:-ieeexplore.ieee.org-xpl-freeabs_all.jsp?arnumber=572125.

An Input-Output Linearization Approch to the Control of an N-Body Articulated Vehicle Sep. 2001 http:-scitation.aip.org-getabs-servlet-GetabsServlet?prog=normal
&id=JDSMAA000123000003000309000001&idtype=cvips
&gifs=yes&ref=no.

* cited by examiner

TRAILER PATH CURVATURE CONTROL FOR TRAILER BACKUP ASSIST

CROSS REFERENCE TO RELATED APPLICATIONS

This patent application claims priority from U.S. Provisional Patent Application which has Ser. No. 61/477,132, which was filed Apr. 19, 2011, which is entitled "Trailer Backup Assist Curvature Control", and which has a common applicant herewith and is being incorporated herein in its entirety by reference.

FIELD OF THE DISCLOSURE

The disclosures made herein relate generally to steering assist technologies in vehicles and, more particularly, to trailer path curvature control for trailer backup assist.

BACKGROUND

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc). One reason for such difficulty is that backing a vehicle with an attached trailer requires counter-steering that is opposite to normal steering when backing the vehicle without a trailer attached and/or requires braking to stabilize the vehicle-trailer combination before a jackknife condition occurs. Another reason for such difficulty is that small errors in steering while backing a vehicle with an attached trailer are amplified thereby causing the trailer to depart from a desired path.

To assist the driver in steering a vehicle with trailer attached, a trailer backup assist system needs to know the driver's intention. One common assumption with known trailer backup assist systems is that a driver of a vehicle with an attached trailer wants to back up straight and the system either implicitly or explicitly assumes a zero curvature path for the vehicle-trailer combination. Unfortunately most of real-world use cases of backing a trailer involve a curved path and, thus, assuming a path of zero curvature would significantly limit usefulness of the system. Some known systems assume that a path is known from a map or path planner. To this end, some known trailer backup assist systems operate under a requirement that a trailer back-up path is known before backing of the trailer commences such as, for example, from a map or a path planning algorithm. Undesirably, such implementations of the trailer backup assist systems are known to have a relatively complex Human Machine Interface (HMI) to specify the path, obstacles and/or goal of the backup maneuver. Furthermore, such systems also require some way to determine how well the desired path is being followed and to know when the desired goal, or stopping point and orientation, has been met, using approaches such as cameras, inertial navigation, or high precision GPS. These requirements lead to a relatively complex and costly system.

Therefore, implementing trailer backup assist using a trailer path curvature control approach that is relatively simple and that enables an intuitive vehicle operator interface would be advantageous, desirable and useful.

SUMMARY OF THE DISCLOSURE

Embodiments of the inventive subject matter are directed to trailer backup assist functionality that provides for controlling curvature of a path of a trailer attached to a vehicle. More specifically, trailer backup assist functionality configured in accordance with embodiments of the inventive subject matter provide for such trailer path curvature control by allowing a driver of the vehicle to specify a desired path of the trailer by inputting a desired trailer path curvature as the backup maneuver of the vehicle and trailer progresses. In response to such path of the trailer being specified by the driver, embodiments of the inventive subject matter control a power assisted steering system (e.g., electric power assisted steering (EPAS) system) of the vehicle for implementing steering angle changes of steered wheels of the vehicle to achieve the specified trailer path. Kinematics of the vehicle and the trailer are used to determine the steering angle changes that are required for achieving the specified trailer path. Accordingly, embodiments of the inventive subject matter provide for implementation of trailer backup assist functionality in a manner that is relatively simple and that enables use of an intuitive vehicle operator interface for specifying trailer path curvature control.

In one embodiment of the inventive subject matter, a method of controlling a path of travel of a trailer towably coupled to a vehicle during backing of the trailer by the vehicle comprises a plurality of operations. An operation is performed for receiving trailer path curvature information characterizing a desired curvature for the path of travel of the trailer and an operation is performed for determining vehicle steering information through assessment of kinematical information of a system defined by the vehicle and the trailer. Assessment of the kinematical information is performed as a function of the trailer path curvature information. Thereafter, an operation is performed for generating a steering command for a steering system of the vehicle as a function of the vehicle steering information.

In another embodiment of the inventive subject matter, an electronic control system having a set of instructions tangibly embodied on a non-transitory processor-readable medium thereof. The set of instructions are accessible from the non-transitory processor-readable medium by at least one data processing device of the electronic controller system for being interpreted thereby. The set of instructions is configured for causing the at least one data processing device to carry out an operation for of operations receiving trailer path curvature information for a trailer towably connected to a vehicle, an operations for determining vehicle steering information, and an operations for generating a steering command for a steering system of the vehicle. The trailer path curvature information characterizes a desired curvature for the path of travel of the trailer during backing of the trailer by the vehicle. The vehicle steering information is determined through assessment of kinematical information of a system defined by the vehicle and the trailer. Such assessment of the kinematical information is performed as a function of the trailer path curvature information. The steering command is generated as a function of the vehicle steering information.

In another embodiment of the inventive subject matter, a vehicle comprises a trailer backup steering input apparatus, a trailer backup assist control module coupled to the a trailer backup steering input apparatus, and an electric power assist steering system coupled to the trailer backup assist control module and. The trailer backup steering input apparatus is configured for outputting a trailer path curvature signal approximating a desired curvature for a path of travel of a trailer towably coupled to the vehicle. The trailer backup assist control module is configured for determining vehicle steering information as a function of the trailer path curvature signal. The electric power assist steering system is configured for controlling steering of steered wheels of the vehicle as a function of the vehicle steering information.

These and other objects, embodiments, advantages and/or distinctions of the inventive subject matter will become readily apparent upon further review of the following specification, associated drawings and appended claims.

DETAILED DESCRIPTION OF THE DRAWING FIGURES

The inventive subject matter is directed to providing trailer backup assist functionality in a manner that is relatively low cost and that offers an intuitive user interface. In particular, such trailer backup assist functionality provides for controlling curvature of a path of travel of a trailer attached to a vehicle (i.e., trailer path curvature control) by allowing a driver of the vehicle to specify a desired path of the trailer by inputting a desired trailer path curvature as the backup maneuver of the vehicle and trailer progresses. Although a control knob, a set of virtual buttons, or a touch-screen can each be implemented for enabling trailer path curvature control, the inventive subject matter is not unnecessarily limited to any particular configuration of interface through which a desired trailer path curvature is inputted. Furthermore, in the case where a steering wheel can be mechanically decoupled from steered wheels of the vehicle, the steering wheel can also be used as an interface through which a desired trailer path curvature is inputted. As will be discussed herein in greater detail, kinematical information of a system defined by the vehicle and the trailer are used to calculate a relationship (i.e., kinematics) between the trailer's curvature and the steering angle of the vehicle for determining steering angle changes of the vehicle for achieving the specified trailer path. Steering commands corresponding to the steering angle changes are used for controlling a steering system of the vehicle (e.g., electric power assisted steering (EPAS) system) for implementing steering angle changes of steered wheels of the vehicle to achieve (e.g., to approximate) the specified path of travel of the trailer.

Figure 1:
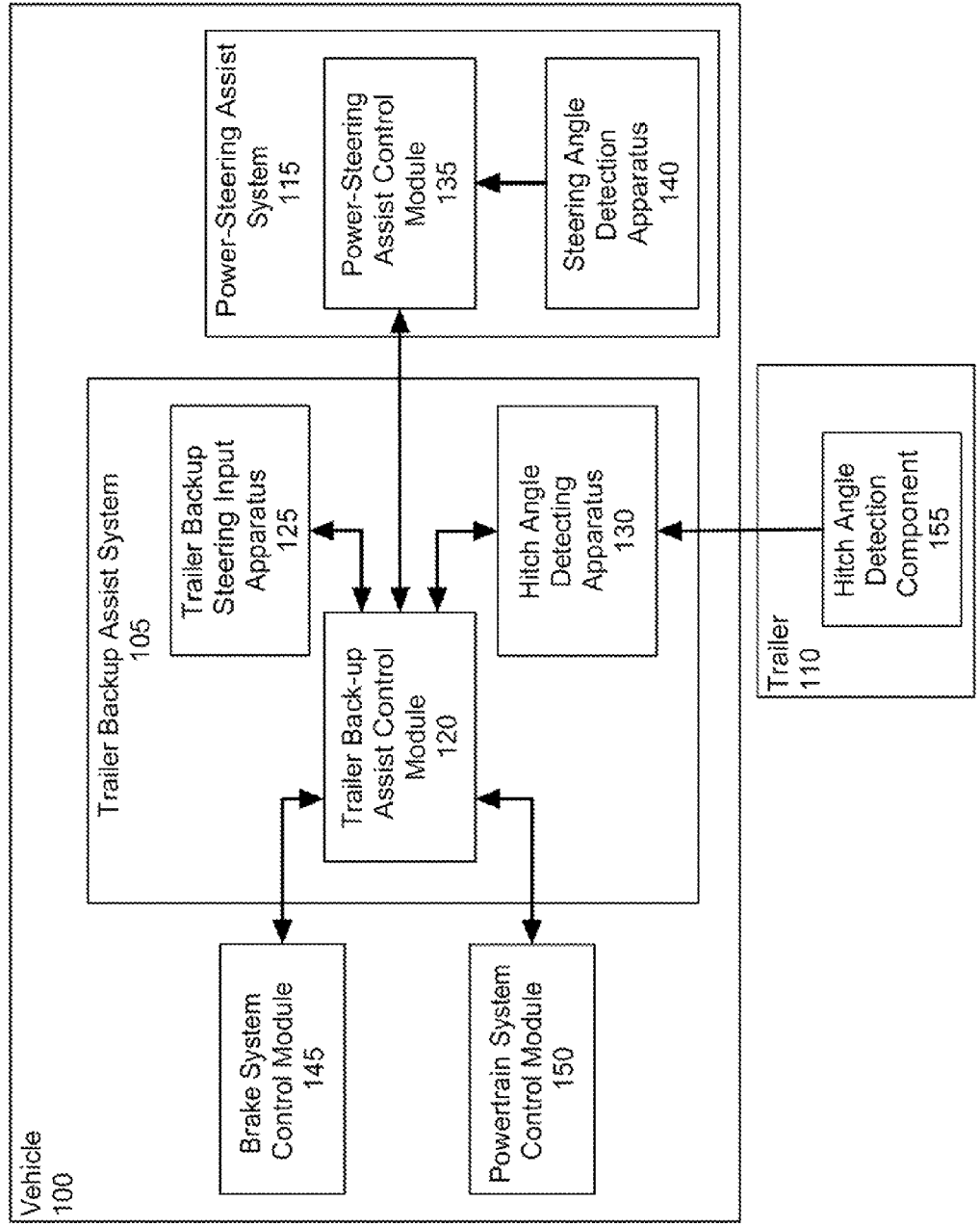
FIG. 1 shows a vehicle configured for performing trailer backup assist functionality in accordance with an embodiment of the inventive subject matter embodiment.

Referring to FIG. 1, an embodiment of a vehicle 100 configured for performing trailer backup assist functionality in accordance with the inventive subject matter is shown. A trailer backup assist system 105 of the vehicle 100 controls the curvature of path of travel of the trailer 110 that is attached to the vehicle 100. Such control is accomplished through interaction of a power assisted steering system 115 of the vehicle 100 and the trailer backup assist system 105. During operation of the trailer backup assist system 105 while the vehicle 100 is being reversed, a driver of the vehicle 100 is sometimes limited in the manner in which he/she can make steering inputs via a steering wheel of the vehicle 100. This is because in certain vehicles the trailer backup assist system 105 is in control of the power assisted steering system 115 and the power assisted steering system 115 is directly coupled to the steering wheel (i.e., the steering wheel of the vehicle 100 moves in concert with steered wheels of the vehicle 100). As is discussed below in greater detail, a human machine interface (HMI) of the backup assist system 105 is used for commanding changes in curvature of a path of the trailer 110 such as a knob, thereby decoupling such commands from being made at the steering wheel of the vehicle 100. However, some vehicles configured to provide trailer backup assist functionality in accordance with the inventive subject matter will have the capability to selectively decouple steering movement from movement of steerable wheels of the vehicle, thereby allowing the steering wheel to be used for commanding changes in curvature of a path of a trailer during such trailer backup assist.

The trailer backup assist system 105 includes a trailer backup assist control module 120, a trailer backup steering input apparatus 125, and a hitch angle detecting apparatus 130. The trailer backup assist control module 120 is connected to the trailer backup steering input apparatus 125 and the hitch angle detecting apparatus 130 for allowing communication of information therebetween. It is disclosed herein that the trailer backup steering input apparatus can be coupled to the trailer backup assist control module 120 in a wired or wireless manner. The trailer backup assist system control module 120 is attached to a power-steering assist control module 135 of the power-steering assist system 115 for allowing information to be communicated therebetween. A steering angle detecting apparatus 140 of the power-steering assist system 115 is connected to the power-steering assist control module 135 for providing information thereto. The trailer backup assist system is also attached to a brake system control module 145 and a powertrain control module 150 for allowing communication of information therebetween. Jointly, the trailer backup assist system 105, the power-steering assist system 115, the brake system control module 145, the powertrain control module 150 define a trailer backup assist architecture configured in accordance with an embodiment of the inventive subject matter.

The trailer backup assist control module 120 is configured for implementing logic (i.e., instructions) for receiving information from the trailer backup steering input apparatus 125, the hitch angle detecting apparatus 130, the power-steering assist control module 135, the brake system control module 145, and the powertrain control module 150. The trailer backup assist control module 120 (e.g., a trailer curvature algorithm thereof) generates vehicle steering information as a function of all or a portion of the information received from the trailer backup steering input apparatus 125, the hitch angle detecting apparatus 130, the power-steering assist control module 135, the brake system control module 145, and the powertrain control module 150. Thereafter, the vehicle steering information is provided to the power-steering assist control module 135 for affecting steering of the vehicle 100 by the power-steering assist system 115 to achieve a commanded path of travel for the trailer 110.

The trailer backup steering input apparatus 125 provides the trailer backup assist control module 120 with information defining the commanded path of travel of the trailer 110 to the trailer backup assist control module 120 (i.e., trailer steering information). The trailer steering information can include information relating to a commanded change in the path of travel (e.g., a change in radius of path curvature) and information relating to an indication that the trailer is to travel along a path defined by a longitudinal centerline axis of the trailer (i.e., along a substantially straight path of travel). As will be discussed below in detail, the trailer backup steering input apparatus 125 preferably includes a rotational control input device for allowing a driver of the vehicle 100 to interface with the trailer backup steering input apparatus 125 to command desired trailer steering actions (e.g., commanding a desired change in radius of the path of travel of the trailer and/or commanding that the trailer travel along a substantially straight path of travel as defined by a longitudinal centerline axis of the trailer). In a preferred embodiment, the rotational control input device is a knob rotatable about a rotational axis extending through a top surface/face of the knob. In other embodiments, the rotational control input device is a knob rotatable about a rotational axis extending substantially parallel to a top surface/face of the knob.

Some vehicles (e.g., those with active front steer) have a power-steering assist system configuration that allows a steering wheel to be decoupled from movement of the steered wheels of such a vehicle. Accordingly, the steering wheel can be rotated independent of the manner in which the power-steering assist system of the vehicle controls the steered wheels (e.g., as commanded by vehicle steering information provided by to a power-steering assist system control module from a trailer backup assist system control module configured in accordance with an embodiment of the inventive subject matter). As such, in these types of vehicles where the steering wheel can be selectively decoupled from the steered wheels to allow independent operation thereof, trailer steering information of a trailer backup assist system configured in accordance with the inventive subject matter can be provided through rotation of the steering wheel. Accordingly, it is disclosed herein that in certain embodiments of the inventive subject matter, the steering wheel is an embodiment of a rotational control input device in the context of the inventive subject matter. In such embodiments, the steering wheel would be biased (e.g., by an apparatus that is selectively engagable/activatable) to an at-rest position between opposing rotational ranges of motion.

The hitch angle detecting apparatus 130, which operates in conjunction with a hitch angle detection component 155 of the trailer 110, provides the trailer backup assist control module 120 with information relating to an angle between the vehicle 100 and the trailer 110 (i.e., hitch angle information). In a preferred embodiment, the hitch angle detecting apparatus 130 is a camera-based apparatus such as, for example, an existing rear view camera of the vehicle 100 that images (i.e., visually monitors) a target (i.e., the hitch angle detection component 155) attached the trailer 110 as the trailer 110 is being backed by the vehicle 100. Preferably, but not necessarily, the hitch angle detection component 155 is a dedicated component (e.g., an item attached to/integral with a surface of the trailer 110 for the express purpose of being recognized by the hitch angle detecting apparatus 130. Alternatively, the hitch angle detecting apparatus 130 can be a device that is physically mounted on a hitch component of the vehicle 100 and/or a mating hitch component of the trailer 110 for determining an angle between centerline longitudinal axes of the vehicle 100 and the trailer 110.

The power-steering assist control module 135 provides the trailer backup assist control module 120 with information relating to a rotational position (e.g., angle) of the steering wheel angle and/or a rotational position (e.g., turning angle (s)) of steered wheels of the vehicle 100. In certain embodiments of the inventive subject matter, the trailer backup assist control module 120 can be an integrated component of the power steering assist system 115. For example, the power-steering assist control module 135 can include a trailer backup assist algorithm for generating vehicle steering information as a function of all or a portion of information received from the trailer backup steering input apparatus 125, the hitch angle detecting apparatus 130, the power-steering assist control module 135, the brake system control module 145, and the powertrain control module 150.

The brake system control module 145 provides the trailer backup assist control module 120 with information relating to vehicle speed. Such vehicle speed information can be determined from individual wheel speeds as monitored by the brake system control module 145. In some instances, individual wheel speeds can also be used to determine a vehicle yaw rate and such yaw rate can be provided to the trailer backup assist control module 120 for use in determining the vehicle steering information. In certain embodiments, the trailer backup assist control module 120 can provide vehicle braking information to the brake system control module 145 for allowing the trailer backup assist control module 120 to control braking of the vehicle 100 during backing of the trailer 110. For example, using the trailer backup assist control module 120 to regulate speed of the vehicle 100 during backing of the trailer 110 can reduce the potential for unacceptable trailer backup conditions. Examples of unacceptable trailer backup conditions include, but are not limited to, a vehicle overspeed condition, a trailer jackknife condition as defined by an angular displacement limit relative to the vehicle 100 and the trailer 110, and the like. It is disclosed herein that the backup assist control module 120 can issue a signal corresponding to a notification (e.g., a warning) of an actual, impending, and/or anticipated unacceptable trailer backup condition.

The powertrain control module 150 interacts with the trailer backup assist control module 120 for regulating speed and acceleration of the vehicle 100 during backing of the trailer 110. As mentioned above, regulation of the speed of the vehicle 100 is necessary to limit the potential for unacceptable trailer backup conditions such as, for example, jackknifing. Similar to high-speed considerations as they relate to unacceptable trailer backup conditions, high acceleration can also lead to such unacceptable trailer backup conditions.

Figure 2:
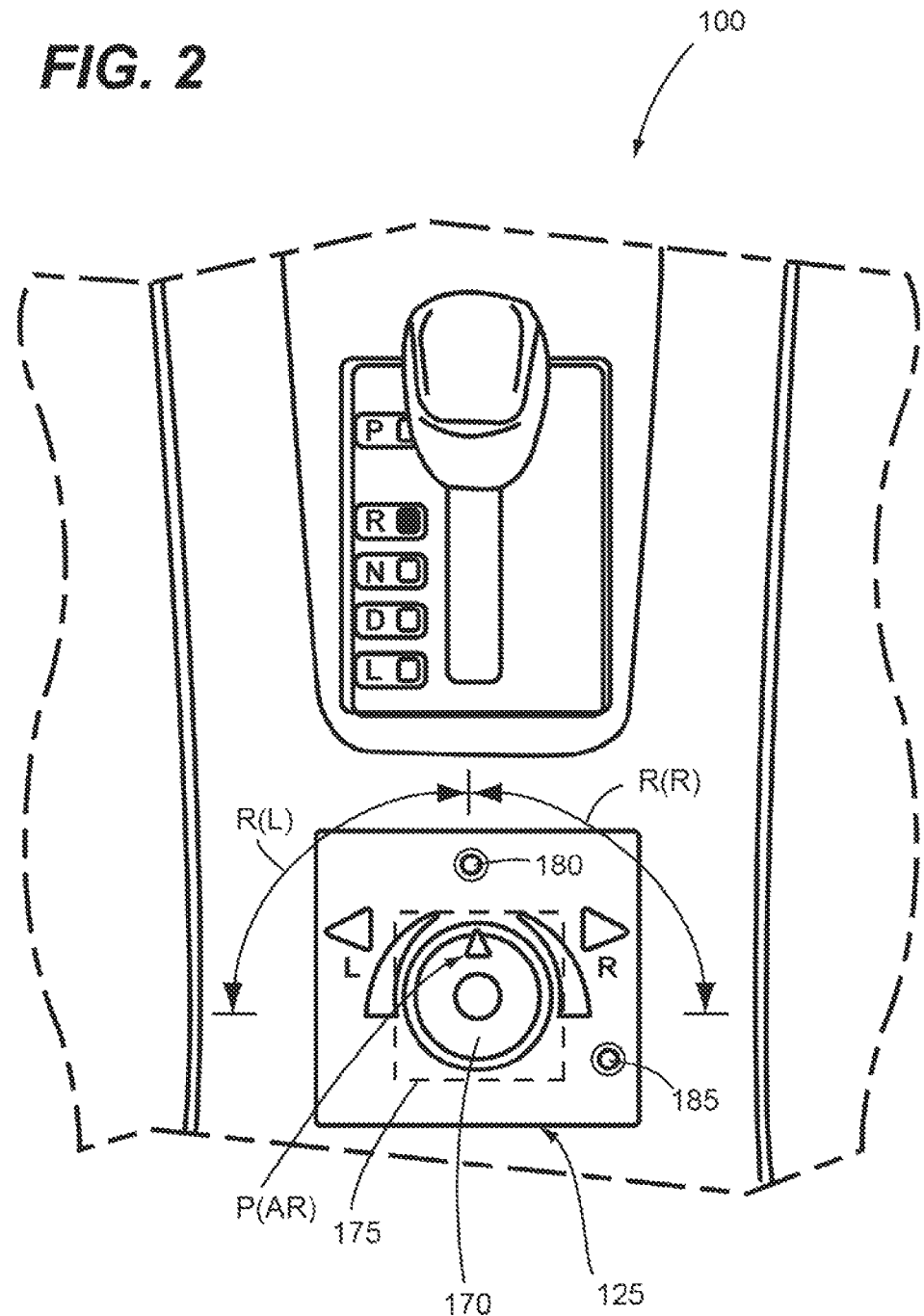
FIG. 2 shows a preferred embodiment of the trailer backup steering input apparatus discussed in reference to FIG. 1.

Referring now to FIG. 2, a preferred embodiment of the trailer backup steering input apparatus 125 discussed in reference to FIG. 1 is shown. A rotatable control element in the form of a knob 170 is coupled to a movement sensing device 175. The knob 170 is biased (e.g., by a spring return) to an at-rest position P(AR) between opposing rotational ranges of motion R(R), R(L). A first one of the opposing rotational ranges of motion R(R) is substantially equal to a second one of the opposing rotational ranges of motion R(L), R(R). To provide a tactile indication of an amount of rotation of the knob 170, a force that biases the knob 170 toward the at-rest position P(AR) can increase (e.g., non-linearly) as a function of the amount of rotation of the knob 170 with respect to the at-rest position P(AR). Additionally, the knob 170 can be configured with position indicating detents such that the driver can positively feel the at-rest position P(AR) and feel the ends of the opposing rotational ranges of motion R(L), R(R) approaching (e.g., soft end stops).

The movement sensing device 175 is configured for sensing movement of the knob 170 and outputting a corresponding signal (i.e., movement sensing device signal) to the trailer assist backup input apparatus 125 shown in FIG. 1. The movement sensing device signal is generated as a function of an amount of rotation of the knob 170 with respect to the at-rest position P(AR), a rate movement of the knob 170, and/or a direction of movement of the knob 170 with respect to the at-rest position P(AR). As will be discussed below in greater detail, the at-rest position P(AR) of the knob 170 corresponds to a movement sensing device signal indicating that the vehicle 100 should be steered such that the trailer 100 is backed along a substantially straight path as defined by a centerline longitudinal axis of the trailer 110 when the knob 170 was returned to the at-rest position P(AR) and a maximum clockwise and anti-clockwise position of the knob 170 (i.e., limits of the opposing rotational ranges of motion R(R), R(L)) each correspond to a respective movement sensing device signal indicating a tightest radius of curvature (i.e., most acute trajectory) of a path of travel of the trailer 110 that is possible without the corresponding vehicle steering information causing a jackknife condition. In this regard, the at-rest position P(AR) is a zero curvature commanding position with respect to the opposing rotational ranges of motion R(R), R(L). It is disclosed herein that a ratio of a commanded curvature of a path of a trailer (e.g., radius of a trailer trajectory) and a corresponding amount of rotation of the knob can vary (e.g., non-linearly) over each one of the opposing rotational ranges of motion P(L), P(R) of the knob 170. It is also disclosed therein that the ratio can be a function of vehicle speed, trailer geometry, vehicle geometry, hitch geometry and/or trailer load.

Use of the knob 170 decouples trailer steering inputs from being made at a steering wheel of the vehicle 100. In use, as a driver of the vehicle 100 backs the trailer 110, the driver can turn the knob 170 to dictate a curvature of a path of the trailer 110 to follow and returns the knob 170 to the at-rest position P(AR) for causing the trailer 110 to be backed along a straight line. Accordingly, in embodiments of trailer backup assist systems where the steering wheel remains physically coupled to the steerable wheels of a vehicle during backup of an attached trailer, a rotatable control element configured in accordance with the inventive subject matter (e.g., the knob 170) provides a simple and user-friendly means of allowing a driver of a vehicle to input trailer steering commands.

It is disclosed herein that a rotational control input device configured in accordance with embodiments of the inventive subject matter (e.g., the knob 170 and associated movement sensing device) can omit a means for being biased to an at-rest position between opposing rotational ranges of motion. Lack of such biasing allows a current rotational position of the rotational control input device to be maintained until the rotational control input device is manually moved to a different position. Preferably, but not necessarily, when such biasing is omitted, a means is provided for indicating that the rotational control input device is positioned in a zero curvature commanding position (e.g., at the same position as the at-rest position in embodiments where the rotational control input device is biased). Examples of means for indicating that the rotational control input device is positioned in the zero curvature commanding position include, but are not limited to, a detent that the rotational control input device engages when in the zero curvature commanding position, a visual marking indicating that the rotational control input device is in the zero curvature commanding position, an active vibratory signal indicating that the rotational control input device is in or approaching the zero curvature commanding position, an audible message indicating that the rotational control input device is in of approaching the zero curvature commanding position, and the like.

It is also disclosed herein that embodiments of the inventive subject matter can be configured with a control input device that is not rotational (i.e., a non-rotational control input device). Similar to a rotational control input device configured in accordance with embodiments of the inventive subject matter (e.g., the knob 170 and associated movement sensing device), such a non-rotational control input device is configured to selectively provide a signal causing a trailer to follow a path of travel segment that is substantially straight and to selectively provide a signal causing the trailer to follow a path of travel segment that is substantially curved. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input path of travel commands, and the like.

The trailer backup steering input apparatus 125 can be configured to provide various feedback information to a driver of the vehicle 100. Examples of situation that such feedback information can indicate include, but are not limited to, a status of the trailer backup assist system 105 (e.g., active, in standby (e.g., when driving forward to reduce the trailer angle), faulted, inactive, etc), that a curvature limit has been reached (i.e., maximum commanded curvature of a path of travel of the trailer 110), etc. To this end, the trailer backup steering input apparatus 125 can be configured to provide a tactile feedback signal (e.g., a vibration through the knob 170) as a warning if any one of a variety of conditions occur. Examples of such conditions include, but are not limited to, the trailer 110 having jackknifed, the trailer backup assist system 105 has had a failure, the trailer backup assist system 105 or other system of the vehicle 100 has predicted a collision on the present path of travel of the trailer 110, the trailer backup system 105 has restricted a commanded curvature of a trailer's path of travel (e.g., due to excessive speed or acceleration of the vehicle 100), and the like. Still further, it is disclosed that the trailer backup steering input apparatus 125 can use illumination (e.g., an LED 180) and/or an audible signal output (e.g., an audible output device 185) to provide certain feedback information (e.g., notification/warning of an unacceptable trailer backup condition).

Figure 3:
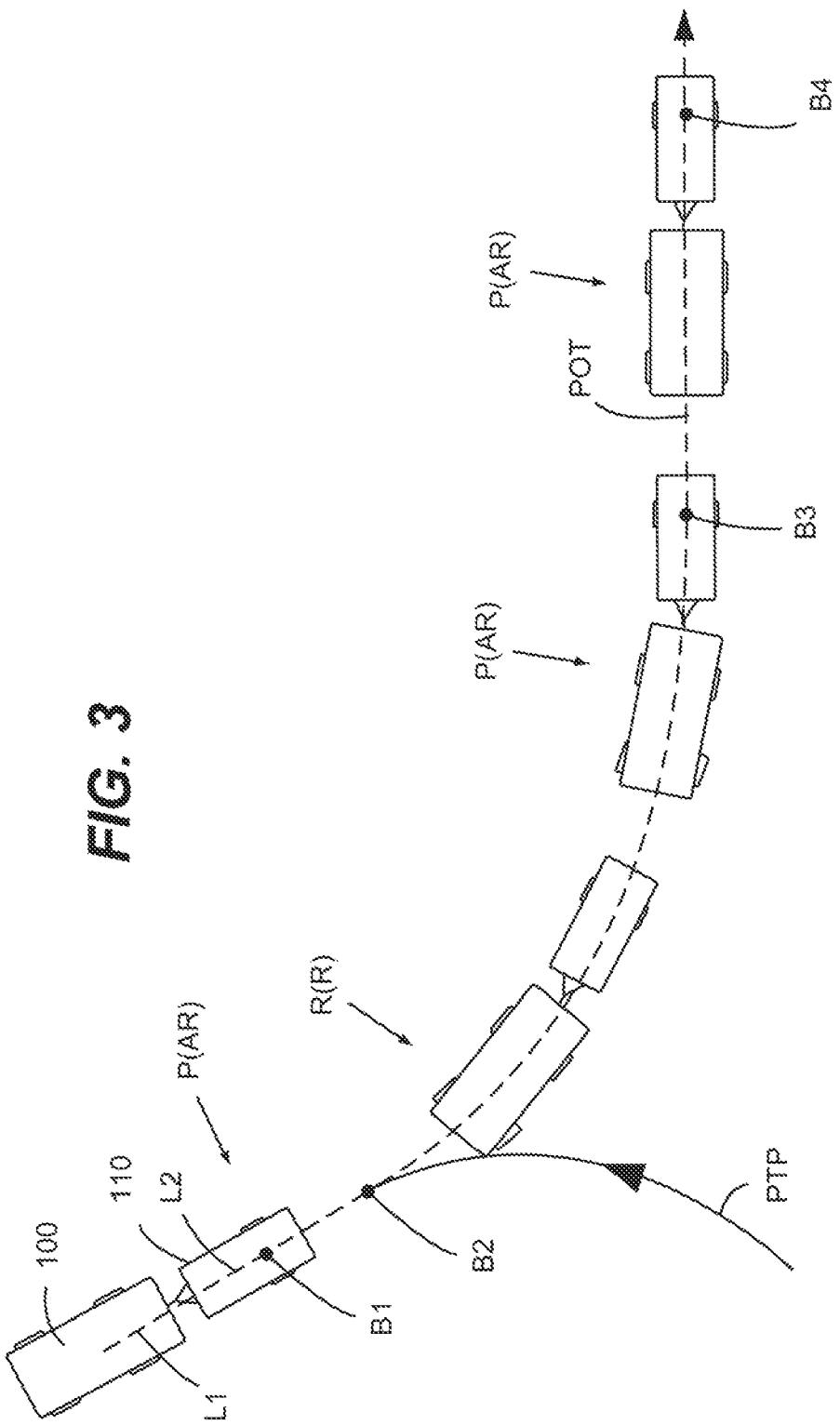
FIG. 3 shows an example of a trailer backup sequence implemented using the trailer backup steering input apparatus discussed in reference to FIG. 2.

Referring now to FIGS. 2 and 3, an example of using the trailer backup steering input apparatus 125 for dictating a curvature of a path of travel (POT) of a trailer (i.e., the trailer 110 shown in FIG. 1) while backing up the trailer with a vehicle (i.e., the vehicle 100 in FIGS. 1 and 2) is shown. In preparation of backing the trailer 110, the driver of the vehicle 100 drives the vehicle 100 forward along a pull-thru path (PTP) to position the vehicle 100 and trailer 110 at a first backup position B1. In the first backup position B1, the vehicle 100 and trailer 110 are longitudinally aligned with each other such that a longitudinal centerline axis L1 of the vehicle 100 is aligned with (e.g., parallel with or coincidental with) a longitudinal centerline axis L2 of the trailer 110. It is disclosed herein that such alignment of the longitudinal axes L1, L2 at the onset of an instance of trailer backup functionality is not a requirement for operability of a trailer backup assist system configured in accordance with the inventive subject matter.

After activating the trailer backup assist system 105 (e.g., before, after, or during the pull-thru sequence), the driver begins to back the trailer 110 by reversing the vehicle 100 from the first backup position B1. So long as the knob 170 of the trailer backup steering input apparatus 125 remains in the at-rest position P(AR), the trailer backup assist system 105 will steer the vehicle 100 as necessary for causing the trailer 110 to be backed along a substantially straight path of travel as defined by the longitudinal centerline axis L2 of the trailer 110 at the time when backing of the trailer 110 began. When the trailer reaches the second backup position B2, the driver rotates the knob 170 to command the trailer 110 to be steered to the right (i.e., a knob position R(R)). Accordingly, the trailer backup assist system 105 will steer the vehicle 100 for causing the trailer 110 to be steered to the right as a function of an amount of rotation of the knob 170 with respect to the at-rest position P(AR), a rate movement of the knob 170, and/or a direction of movement of the knob 170 with respect to the at-rest position P(AR). Similarly, the trailer 110 can be commanded to steer to the left by rotating the knob 170 to the left. When the trailer reaches backup position B3, the driver allows the knob 170 to return to the at-rest position P(AR) thereby causing the trailer backup assist system 105 to steer the vehicle 100 as necessary for causing the trailer 110 to be backed along a substantially straight path of travel as defined by the longitudinal centerline axis L2 of the trailer 110 at the time when the knob 170 was returned to the at-rest position P(AR). Thereafter, the trailer backup assist system 105 steers the vehicle 100 as necessary for causing the trailer 110 to be backed along this substantially straight path to the fourth backup position B4. In this regard, arcuate portions of a path of travel POT of the trailer 110 are dictated by rotation of the knob 170 and straight portions of the path of travel POT are dictated by an orientation of the centerline longitudinal axis L2 of the trailer when the knob 170 is in/returned to the at-rest position P(AR).

Figure 4:
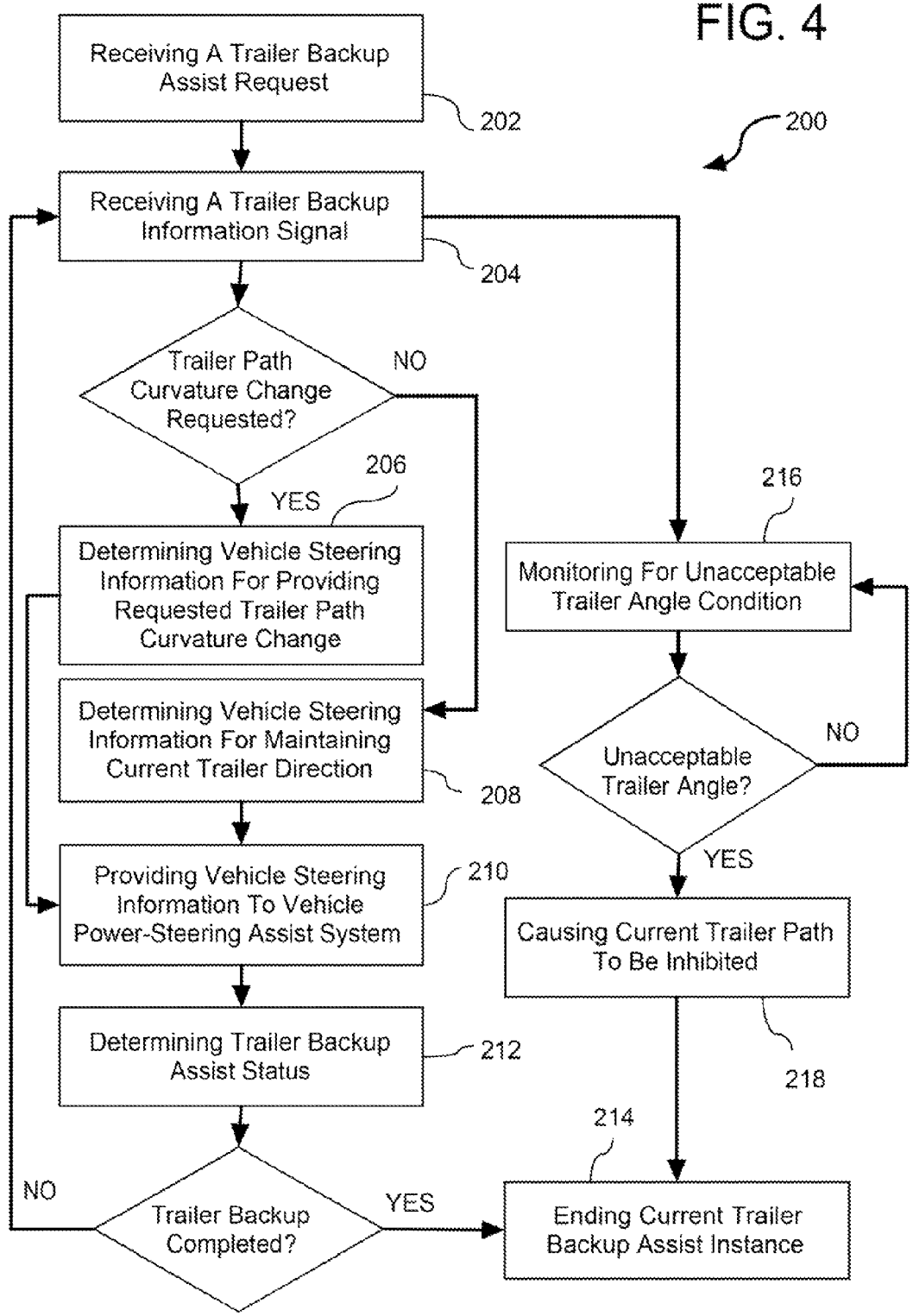
FIG. 4 shows a method for implementing trailer backup assist functionality in accordance with an embodiment of the inventive subject matter.

FIG. 4 shows a method 200 for implementing trailer backup assist functionality in accordance with an embodiment of the inventive subject matter. In a preferred embodiment, the method 200 for implementing trailer backup assist functionality can be carried out using the trailer backup assist architecture discussed above in reference to the vehicle 100 and trailer 110 of FIG. 1. Accordingly, trailer steering information is provided through use of a rotational control input device (e.g., the knob 170 discussed in reference to FIG. 2).

An operation 202 is performed for receiving a trailer backup assist request. Examples of receiving the trailer backup assist request include activating the trailer backup assist system and providing confirmation that the vehicle and trailer are ready to be backed. After receiving a trailer backup assist request (i.e., while the vehicle is being reversed), an operation 204 is performed for receiving a trailer backup information signal. Examples of information carried by the trailer backup information signal include, but are not limited to, information from the trailer backup steering input apparatus 125, information from the hitch angle detecting apparatus 130, information from the power-steering assist control module 135, information from the brake system control module 145, and information from the powertrain control module 150. It is disclosed herein that information from the trailer backup steering input apparatus 125 preferably includes trailer path curvature information characterizing a desired curvature for the path of travel of the trailer, such as provided by the trailer backup steering input apparatus 125 discussed above in reference to FIGS. 1 and 2. In this manner, the operation 204 for receiving the trailer backup information signal can include receiving trailer path curvature information characterizing the desired curvature for the path of travel of the trailer.

If the trailer backup information signal indicates that a change in curvature of the trailer's path of travel is requested (i.e., commanded via the knob 170), an operation 206 is performed for determining vehicle steering information for providing the requested change in curvature of the trailer's path of travel. Otherwise, an operation 208 is performed for determining vehicle steering information for maintaining a current straight-line heading of the trailer (i.e., as defined by the longitudinal centerline axis of the trailer). Thereafter, an operation 210 is performed for providing the vehicle steering information to a power-steering assist system of the vehicle, followed by an operation 212 being performed for determining the trailer backup assist status. If it is determined that trailer backup is complete, an operation 214 is performed for ending the current trailer backup assist instance. Otherwise the method 200 returns to the operation 204 for receiving trailer backup information. Preferably, the operation for receiving the trailer backup information signal, determining the vehicle steering information, providing the vehicle steering information, and determining the trailer backup assist status are performed in a monitoring fashion (e.g., at a high rate of speed of a digital data processing device). Accordingly, unless it is determined that reversing of the vehicle for backing the trailer is completed (e.g., due to the vehicle having been successfully backed to a desired location during a trailer backup assist instance, the vehicle having to be pulled forward to begin another trailer backup assist instance, etc), the method 200 will continually be performing the operations for receiving the trailer backup information signal, determining the vehicle steering information, providing the vehicle steering information, and determining the trailer backup assist status.

It is disclosed herein that the operation 206 for determining vehicle steering information for providing the requested change in curvature of the trailer's path of travel preferably includes determining vehicle steering information as a function of trailer path curvature information contained within the trailer backup information signal. As will be discussed below in greater detail, determining vehicle steering information can be accomplished through a low order kinematic model defined by the vehicle and the trailer. Through such a model, a relationship between the trailer path curvature and commanded steering angles of steered wheels of the vehicle can be generated for determining steering angle changes of the steered wheels for achieving a specified trailer path curvature. In this manner, the operation 206 for determining vehicle steering information can be configured for generating information necessary for providing trailer path curvature control in accordance with the inventive subject matter.

In some embodiments of the inventive subject matter, the operation 210 for providing the vehicle steering information to the power-steering assist system of the vehicle causes the steering system to generate a corresponding steering command as a function of the vehicle steering information. The steering command is interpretable by the steering system and is configured for causing the steering system to move steered wheels of the steering system for achieving a steered angle as specified by the vehicle steering information. Alternatively, the steering command can be generated by a controller, module or computer external to the steering system (e.g., a trailer backup assist control module) and be provided to the steering system.

In parallel with performing the operations for receiving the trailer backup information signal, determining the vehicle steering information, providing the vehicle steering information, and determining the trailer backup assist status, the method 200 performs an operation 216 for monitoring the trailer backup information for determining if an unacceptable trailer backup condition exists. Examples of such monitoring include, but are not limited to assessing a hitch angle to determine if a hitch angle threshold is exceeded, assessing a backup speed to determine if a backup speed threshold is exceeded, assessing vehicle steering angle to determining if a vehicle steering angle threshold is exceeded, and the like. If it is determined that an unacceptable trailer backup condition exists, an operation 218 is performed for causing the current path of travel of the trailer to be inhibited (e.g., stopping motion of the vehicle), followed by the operation 214 being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable trailer angle condition is impending or approaching. In one example, if such feedback results in the unacceptable trailer angle condition being remedied prior to achieving a critical condition, the method can continue with providing trailer backup assist functionality in accordance with operations 204-212. Otherwise, the method can proceed to operation 214 for ending the current trailer backup assist instance. In conjunction with performing the operation 214 for ending the current trailer backup assist instance, an operation can be performed for controlling movement of the vehicle to correct or limit a jackknife condition (e.g., steering and/or decelerating the vehicle to preclude the hitch angle from being exceeded).

Turning now to a discussion of a kinematic model used to calculate a relationship between a curvature of a path of travel of a trailer and the steering angle of a vehicle towing the trailer, a low order kinematic model can be desirable for a trailer back-up assist system configured in accordance with some embodiments of the inventive subject matter. To achieve such a low order kinematic model, certain assumptions are made with regard to parameters associated with the vehicle/trailer system. Examples of such assumptions include, but are not limited to, the trailer being backed by the vehicle at a relatively low speed, wheels of the vehicle and the trailer having negligible (e.g., no) slip, tires of the vehicle and the trailer having negligible (e.g., no) deformation, actuator dynamics of the vehicle being negligible, the vehicle and the trailer exhibiting negligible (e.g., no) roll or pitch motions.

Figure 5:
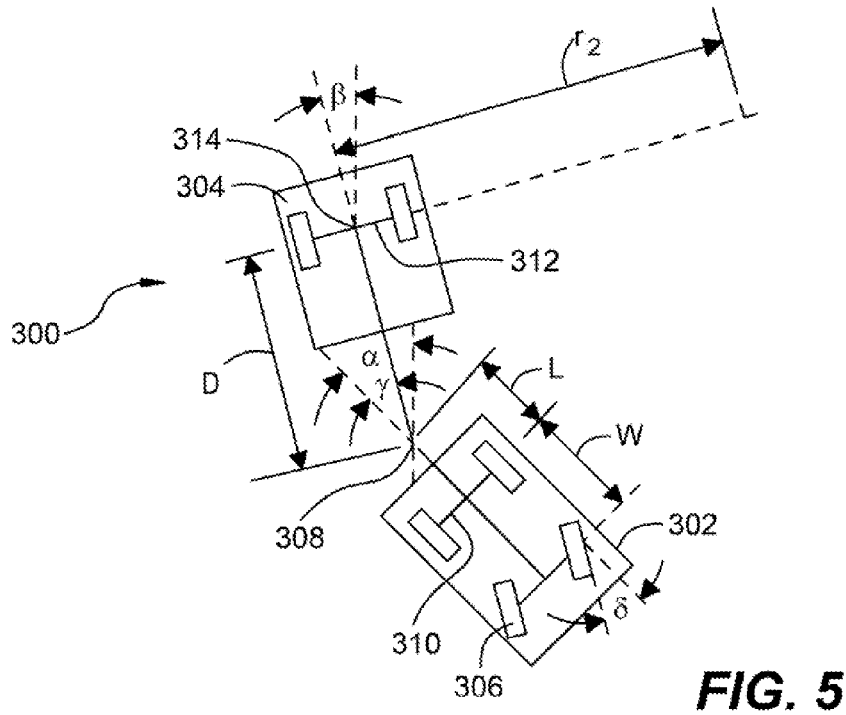
FIG. 5 is a diagrammatic view showing a kinematic model configured for providing information utilized in providing trailer backup assist functionality in accordance with the inventive subject matter.

As shown in FIG. 5, for a system defined by a vehicle 302 and a trailer 304, the kinematic model 300 is based on various parameters associated with the vehicle 302 and the trailer 304. These kinematic model parameters include:

δ: steering angle at steered front wheels 306 of the vehicle 302;
α: yaw angle of the vehicle 302;
β: yaw angle of the trailer 304;
γ: hitch angle (γ=β−α);
W: wheel base of the vehicle 302;
L: length between hitch point 308 and rear axle 310 of the vehicle 302;
D: length between hitch point 308 and axle 312 of the trailer 304; and
$r_2$: curvature radius for the trailer 304.

The kinematic model 300 of FIG. 5 reveals a relationship between trailer path radius of curvature $r_2$ at the midpoint 314 of an axle 306 of the trailer 304, steering angle δ of the steered wheels 306 of the vehicle 302, and the hitch angle γ. As shown in the equation below, this relationship can be expressed to provide the trailer path curvature κ2 such that, if γ is given, the trailer path curvature κ2 can be controlled based on regulating the steering angle δ (where β(.) is trailer yaw rate and η(.) is trailer velocity).

$$\kappa_2 = \frac{1}{r_2} = \frac{\dot\beta}{\dot\eta} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

Or, this relationship can be expressed to provide the steering angle δ as a function of trailer path curvature κ2 and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain kinematic model parameters (e.g., D, W and L) are constant and assumed known. V is the vehicle longitudinal speed and g is the acceleration due to gravity. K is a speed dependent parameter which when set to zero makes the calculation of steering angle independent of vehicle speed. For example, vehicle-specific kinematic model parameters can be predefined in an electronic control system of a vehicle and trailer-specific kinematic model parameters can be inputted by a driver of the vehicle. Trailer path curvature $\kappa_2$ is determined from the driver input via a trailer backup steering input apparatus. Through the use of the equation for providing steering angle, a corresponding steering command can be generated for controlling a steering system (e.g., an actuator thereof) of the vehicle.

Figure 6:
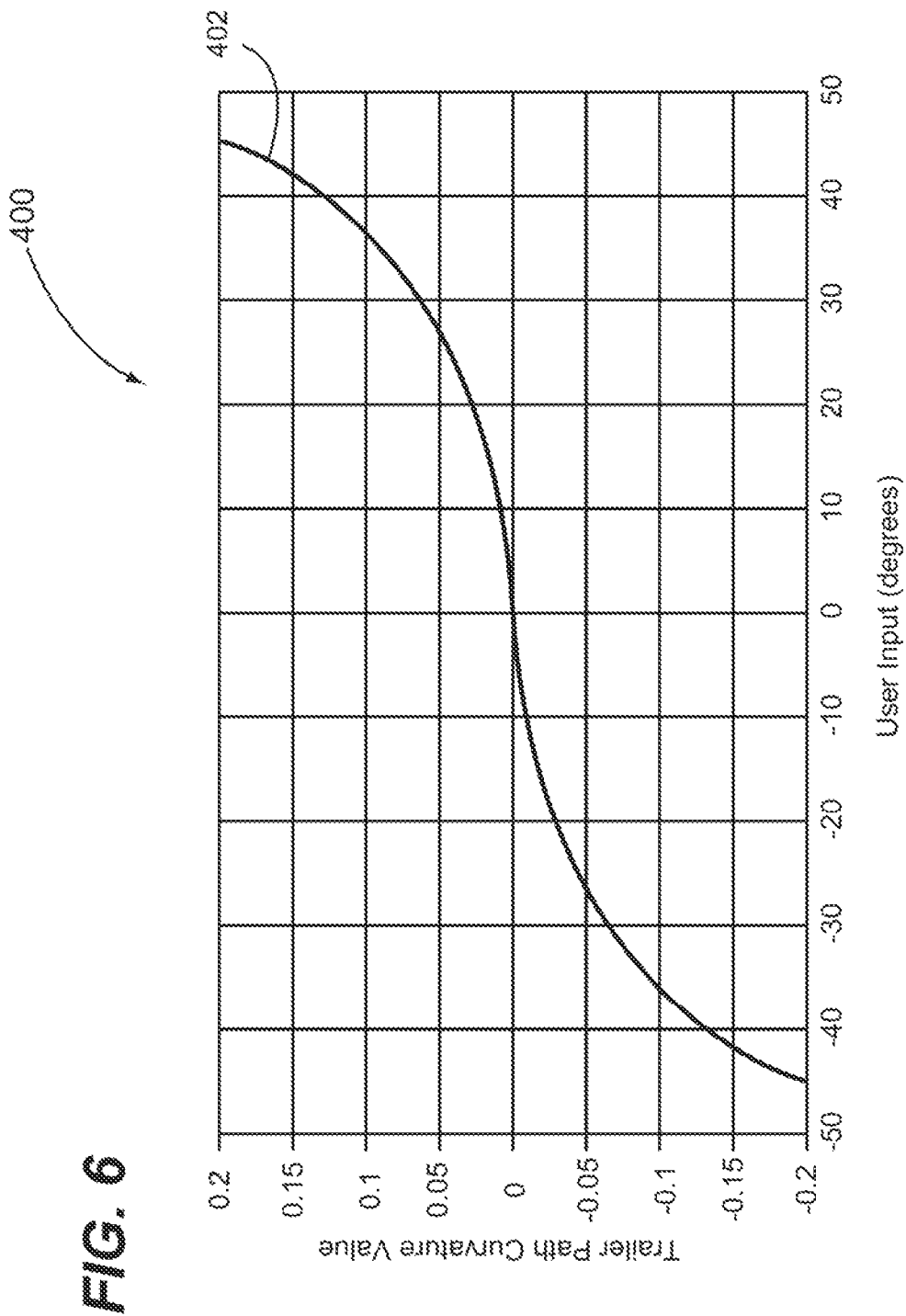
FIG. 6 is a graph showing an example of a trailer path curvature function plot for a rotary-type trailer backup steering input apparatus configured in accordance with the inventive subject matter.

FIG. 6 shown an example of a trailer path curvature function plot 400 for a rotary-type trailer backup steering input apparatus (e.g., the trailer backup steering input apparatus 125 discussed above in reference to FIGS. 1 and 2). A value representing trailer path curvature (e.g., trailer path curvature κ2) is provided as an output signal from the rotary-type trailer backup steering input apparatus as a function of user input movement. In this example, a curve 402 specifying trailer path curvature relative to user input (e.g., amount of rotation) at a rotary input device (e.g., a knob) is defined by a cubic function. However, a skilled person will appreciate that embodiments of the inventive subject matter are not limited to any particular function between a magnitude and/or rate of input at a trailer backup steering input apparatus (e.g., knob rotation) and a resulting trailer path curvature value.

Referring to FIG. 5, in preferred embodiments of the inventive subject matter, it is desirable to limit the potential for the vehicle 302 and the trailer 304 to attain a jackknife angle (i.e., the vehicle/trailer system achieving a jackknife condition). A jackknife angle γ (j) refers to a hitch angle γ that cannot be overcome by the maximum steering input for a vehicle such as, for example, the steered front wheels 306 of the vehicle 302 being moved to a maximum steered angle δ at a maximum rate of steering angle change. The jackknife angle γ (j) is a function of a maximum wheel angle for the steered wheel 306 of the vehicle 302, the wheel base W of the vehicle 302, the distance L between hitch point 308 and the rear axle 310 of the vehicle 302, and the length D between the hitch point 308 and the axle 312 of the trailer 304. When the hitch angle γ for the vehicle 302 and the trailer 304 achieves or exceeds the jackknife angle γ (j), the vehicle 302 must be pulled forward to reduce the hitch angle γ. Thus, for limiting the potential for a vehicle/trailer system attaining a jackknife angle, it is preferable to control the yaw angle of the trailer while keeping the hitch angle of the vehicle/trailer system relatively small.

Figure 7:
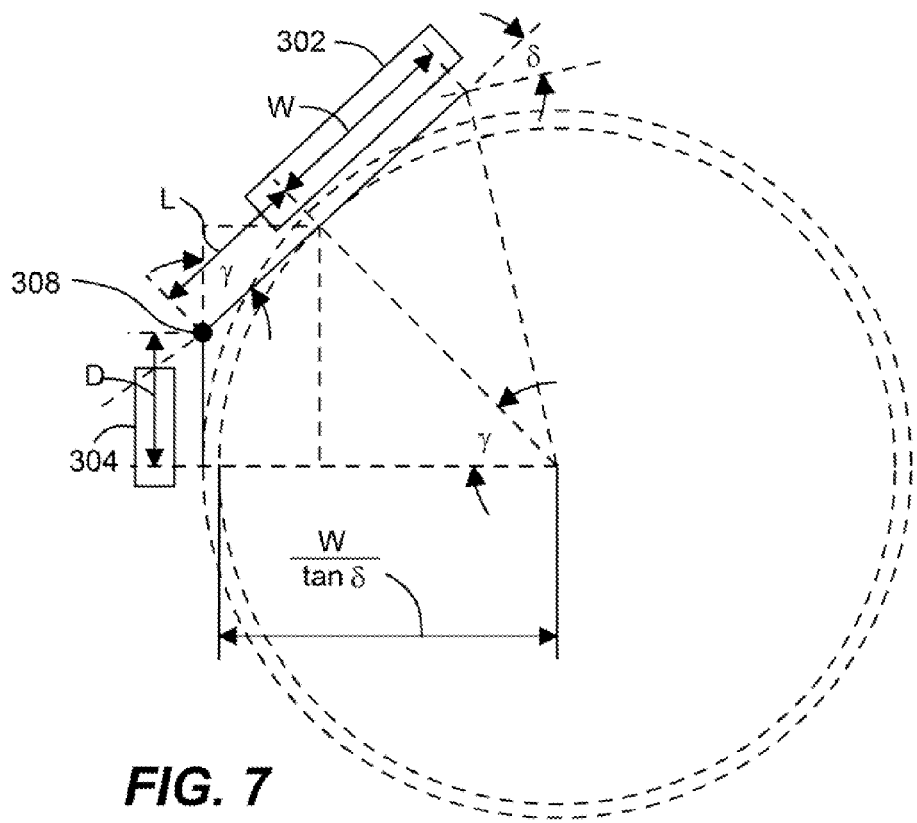
FIG. 7 is a diagrammatic view showing a relationship between hitch angle and steered angle as it relates to determining a jackknife angle for a vehicle/trailer system.

Referring to FIGS. 5 and 7, a steering angle limit for the steered front wheels 306 requires that the hitch angle γ cannot exceed the jackknife angle γ (j), which is also referred to as a critical hitch angle. Thus, under the limitation that the hitch angle γ cannot exceed the jackknife angle γ(j), the jackknife angle γ (j) is the hitch angle γ that maintains a circular motion for the vehicle/trailer system when the steered wheels 306 are at a maximum steering angle δ(max). The steering angle for circular motion with hitch angle is defined by the following equation.

$$\tan \delta_{max} = \frac{W \sin \gamma_{max}}{D + L \cos \gamma_{max}}$$

Solving the above equation for hitch angle allows jackknife angle γ(j) to be determined. This solution, which is shown in the following equation, can be used in implementing trailer backup assist functionality in accordance with the inventive subject matter for monitoring hitch angle in relation to jackknife angle.

$$\cos \bar{\gamma} = \frac{-b \pm \sqrt{b^2 - 4ac}}{2a},$$

where, $a = L^2 \tan^2 \delta(\max) + W^2$;

$b = 2LD \tan^2 \delta(\max)$; and $c = D^2 \tan^2 \delta(\max) - W^2$.

Referring now to instructions processible by a data processing device, it will be understood from the disclosures made herein that methods, processes and/or operations adapted for carrying out trailer backup assist functionality as disclosed herein are tangibly embodied by non-transitory computer readable medium having instructions thereon that are configured for carrying out such functionality. The instructions are tangibly embodied for carrying out the method 200 disclosed and discussed above and can be further configured for limiting the potential for a jackknife condition such as, for example, by monitoring jackknife angle through use of the equations discussed in reference to FIGS. 5 and 7. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive subject matter include a compact disk, a hard drive, RAM or other type of storage apparatus that has imaged thereon a computer program (i.e., instructions) configured for carrying out trailer backup assist functionality in accordance with the inventive subject matter.

In a preferred embodiment of the inventive subject matter, a trailer back-up assist control module (e.g., the trailer back-up assist control module 120 discussed above in reference to FIG. 1) comprises such a data processing device, such a non-transitory computer readable medium, and such instructions on the computer readable medium for carrying out trailer backup assist functionality (e.g., in accordance with the method 200 discussed above in reference to FIG. 2). To this end, the trailer back-up assist control module can comprise various signal interfaces for receiving and outputting signals. A trailer back-up assist control module in the context of the inventive subject matter can be any control module of an electronic control system that provides for trailer back-up assist control functionality in accordance with the inventive subject matter. Furthermore, it is disclosed herein that such a control functionality can be implemented within a standalone control module (physically and logically) or can be implemented logically within two or more separate but interconnected control modules (e.g., of an electronic control system of a vehicle) In one example, trailer back-up assist control module in accordance with the inventive subject matter is implemented within a standalone controller unit that provides only trailer backup assist functionality. In another example, trailer backup assist functionality in accordance with the inventive subject matter is implemented within a standalone controller unit of an electronic control system of a vehicle that provides trailer backup assist functionality as well as one or more other types of system control functionality of a vehicle (e.g., anti-lock brake system functionality, steering power assist functionality, etc). In still another example, trailer backup assist functionality in accordance with the inventive subject matter is implemented logically in a distributed manner whereby a plurality of control units, control modules, computers, or the like (e.g., an electronic control system) jointly carry out operations for providing such trailer backup assist functionality.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of controlling a path of travel of a trailer towably coupled to a vehicle during backing of the trailer by the vehicle, comprising:
   receiving trailer path curvature information characterizing a desired curvature for the path of travel of the trailer, the desired curvature is relative to a zero curvature position that is defined by backward movement of the trailer along a substantially straight path defined by a centerline longitudinal axis of the trailer;
   determining vehicle steering information through assessment of kinematical information of a system defined by the vehicle and the trailer, assessment of the kinematical information is performed as a function of the trailer path curvature information; and
   generating a steering command for a steering system of the vehicle as a function of the vehicle steering information.

2. The method of claim 1 wherein determining the vehicle steering information includes:
   determining a jackknife angle for the system; and
   determining a steering angle for steered wheels of the vehicle required for limiting a potential for the system achieving the jackknife angle.

3. The method of claim 1 wherein the kinematical information includes:
   hitch angle defined between the vehicle and the trailer;
   a wheel base dimension of the vehicle;
   a rear axle-to-hitch rotation point for the vehicle; and
   an axle-to-hitch rotation point for the trailer.

4. The method of claim 1 wherein receiving the trailer path curvature information includes receiving the trailer path curvature information from a trailer backup steering input apparatus that is mechanically detached from steered wheels of the vehicle.

5. The method of claim 4 wherein an output: signal of the trailer backup steering input apparatus is a function of an input signal approximating the desired curvature for the path of travel of the trailer.

6. The method of claim 1 generating the steering command includes generating a steering system command signal for causing the steering system to alter a steering angle of steered wheels thereof such that a corresponding maneuver of the vehicle results in the trailer achieving a path of travel having a curvature that approximates the desired curvature.

7. The method of claim 6 wherein:
   determining the vehicle steering information includes determining a jackknife angle for the system and determining a steering angle for the steered wheels of the vehicle required for limiting a potential for the system achieving the jackknife angle; and
   the steering system command signal is a function of the steering angle.

8. The method of claim 6 wherein:
   receiving the trailer path curvature information includes receiving the trailer path curvature information from a trailer backup steering input apparatus that is mechanically detached from steered wheels of the vehicle; and
   an output signal of the trailer backup steering input apparatus is a function of an input signal approximating the desired curvature for a path of travel of the trailer.

9. The method of claim 8 wherein:
   determining the vehicle steering information includes determining a jackknife angle for the system and determining a steering angle for the steered wheels of the vehicle required for precluding the system from achieving the jackknife angle; and
   the steering system command signal is a function of the steering angle.

10. An electronic control system having a set of instructions tangibly embodied on a non-transitory processor-readable medium thereof, the set of instructions are accessible from the non-transitory processor-readable medium by at least one data processing device of the electronic controller system for being interpreted thereby, and the set of instructions is configured for causing the at least one data processing device to carry out operations for:
    receiving trailer path curvature information characterizing a desired curvature for a path of travel of a trailer during backing of the trailer by a vehicle towably coupled thereto, the desired curvature is relative to a zero curvature position defined by backward movement of the trailer in a substantially straight line defined by a centerline longitudinal axis of the trailer;
    determining vehicle steering information through assessment of kinematical information of a system defined by the vehicle and the trailer, assessment of the kinematical information is performed as a function of the trailer path curvature information; and
    generating a steering command for a steering system of the vehicle as a function of the vehicle steering information.

11. The electronic control system of claim 10 wherein determining the vehicle steering information includes:
    determining a jackknife angle for the system; and
    determining a steering angle for steered wheels of the vehicle required for limiting a potential for the system achieving the jackknife angle.

12. The electronic control system of claim 10 wherein the kinematical information includes:
    hitch angle defined between the vehicle and the trailer;
    a wheel base dimension of the vehicle;
    a rear axle-to-hitch rotation point for the vehicle; and
    an axle-to-hitch rotation point for the trailer.

13. The electronic control system of claim 10 wherein:
    the electronic control system comprises a trailer backup steering input apparatus;
    receiving the trailer path curvature information includes receiving the trailer path curvature information from the trailer backup steering input apparatus that is mechanically detached from steered wheels of the vehicle; and
    an output signal of the trailer backup steering input apparatus is a function of an input signal approximating the desired curvature for the path of travel of the trailer.

14. The electronic control system of claim 10 generating the steering command includes generating a steering system command signal for causing the steering system to alter a steering angle of steered wheels thereof such that a corresponding maneuver of the vehicle results in the trailer achieving a path of travel having a curvature that approximates the desired curvature.

15. The electronic control system of claim 14 wherein:
    determining the vehicle steering information includes determining a jackknife angle for the system and determining a steering angle for the steered wheels of the vehicle required for limiting a potential for the system achieving the jackknife angle; and
    the steering system command signal is a function of the steering angle.

16. The electronic control system of claim 14 wherein:
    the electronic control system comprises a trailer backup steering input apparatus;
    receiving the trailer path curvature information includes receiving the trailer path curvature information from the trailer backup steering input apparatus that is mechanically detached from steered wheels of the vehicle; and
    an output signal of the trailer backup steering input apparatus is a function of an input signal.

17. A trailer backup assist system for a vehicle, comprising:
    a trailer backup steering input apparatus for outputting a trailer path curvature signal approximating a desired curvature for a path of travel of a trailer towably coupled to the vehicle, the desired curvature is relative to a zero curvature position defined by backward movement of the trailer in a straight path defined by a centerline longitudinal axis of the trailer;
    a trailer backup assist control module coupled to the a trailer backup steering input apparatus and configured for determining vehicle steering information as a function of the trailer path curvature signal; and
    an electric power assist steering system coupled to the trailer backup assist control module and configured for controlling steering of steered wheels of the vehicle as a function of the vehicle steering information.

18. The system of claim 17 wherein determining the vehicle steering information includes assessing kinematical information of a system defined by the vehicle and the trailer.

19. The system of 18 wherein determining the vehicle steering information includes:
determining a jackknife angle for the system; and
determining a steering angle for the steered wheels of the vehicle required for limiting a potential for the system achieving the jackknife angle.

20. The system of claim 19 wherein the kinematical information utilized in determining the jackknife angle includes:
a maximum steered angle for steered wheels of the vehicle;
a wheel base dimension of the vehicle;
a rear axle-to-hitch rotation point for the vehicle; and
an axle-to-hitch rotation point for the trailer.

21. The system of claim 17 wherein the trailer backup steering input apparatus is mechanically detached from steered wheels of the vehicle.

22. The system of claim 17 wherein determining the vehicle steering information includes generating a steering system command signal for causing the electric power assist steering system to alter a steering angle of steered wheels thereof such that a corresponding maneuver of the vehicle results in the trailer achieving a path of travel having a curvature that approximates the desired curvature.

23. The system of claim 22 wherein:
determining the vehicle steering information includes determining a jackknife angle for the system and determining a steering angle for the steered wheels of the vehicle required for limiting a potential for the system achieving the jackknife angle; and
the steering system command signal is a function of the steering angle.

24. The system of claim 23 wherein determining the vehicle steering information includes assessing kinematical information of a system defined by the vehicle and the trailer.

25. A method of controlling a path of travel of a trailer towably coupled to a vehicle during backing of the trailer by the vehicle, comprising:
receiving trailer angle information from a trailer angle detection apparatus of a vehicle having a trailer attached thereto, wherein the trailer angle information is generated as a function of an angular displacement between the vehicle and the trailer;
receiving trailer path curvature information characterizing a desired curvature for a path of travel of the trailer from a trailer backup steering input apparatus of the vehicle, the trailer backup steering input apparatus includes a rotational control input device positionable at a zero curvature commanding position and at positions within opposing rotational ranges of motion relative to the zero curvature commanding position and the trailer steering information is derived from at least one of an amount of rotation of the rotational control input device with respect to the zero curvature commanding position, a rate movement of the rotational control input device, and a direction of movement of the rotational control input device with respect to the zero curvature commanding position;
determining vehicle steering information through assessment of kinematical information of a system defined by the vehicle and the trailer, assessment of kinematical information is performed as a function of the trailer path curvature information;
generating a steering command for a steering system of the vehicle as a function of the vehicle steering information; and
controlling a power steering system of the vehicle using vehicle steering information as the trailer is being backed by the vehicle, the vehicle steering information is generated as a function of the trailer angle information and the trailer path curvature information.

26. The method of claim 25 wherein the vehicle steering information causes the trailer to travel along a commanded curvature of a path of travel when the rotational control input device is in a position other than the zero curvature commanding position.

27. The method of claim 26 wherein:
a first one of the opposing rotational ranges of motion is substantially equal to a second one of the opposing rotational ranges of motion; and
a chance in curvature of the path of travel of the trailer varies as a function of the amount of rotation of the rotational control input device.

28. The method of claim 27 wherein controlling the power steering system includes:
causing the power steering system to steer the vehicle such that a curvature of the path of travel of the trailer is altered as a function of an amount and direction of rotation of the rotational input device relative to the zero curvature commanding position while the trailer is being backed up by the vehicle; and
causing the power steering system to steer the vehicle such that the trailer is backed along a substantially straight line as defined by a centerline longitudinal axis of the trailer at a point in time when the rotational control input device is returned to the zero curvature commanding position from a position other than the zero curvature commanding position.

29. The method of claim 25 wherein determining the vehicle steering information includes:
determining a jackknife angle for the system; and
determining a steering angle for steered wheels of the vehicle required for limiting a potential for the system achieving the jackknife angle.

30. The method of claim 25 wherein the kinematical information includes:
hitch angle defined between the vehicle and the trailer;
a wheel base dimension of the vehicle;
a rear axle-to-hitch rotation point for the vehicle; and
an axle-to-hitch rotation point for the trailer.

31. The method of claim 25 generating the steering command includes generating a steering system command signal for causing the steering system to alter a steering angle of steered wheels thereof such that a corresponding maneuver of the vehicle results in the trailer achieving a path of travel having a curvature that approximates the desired curvature.

32. The method of claim 30 wherein:
determining the vehicle steering information includes determining a jackknife angle for the system and determining a steering angle for the steered wheels of the vehicle required for limiting a potential for the system achieving the jackknife angle; and
the steering system command signal is a function of the steering angle.

33. A trailer backup steering system for a vehicle, comprising:
a trailer angle detection apparatus configured for outputting a signal generated as a function of an angle between the vehicle and a trailer attached to the vehicle;

a trailer backup steering input apparatus for outputting a trailer path curvature signal approximating a desired curvature for a path of travel of a trailer towably coupled to the vehicle, the desired curvature is relative to a zero curvature position defined by backward movement of the trailer along a straight path defined by a centerline longitudinal axis of the trailer, the trailer backup steering input apparatus including a knob and a knob movement sensing device coupled to the knob for sensing movement of the knob, the knob is biased to an at-rest position between opposing rotational ranges of motion, the at-rest position corresponds to the zero curvature position, the knob movement sensing device outputs a signal generated as a function of at least one of an amount of rotation of the knob with respect to the at-rest position, a rate movement of the knob, and a direction of movement of the knob with respect to the at-rest position;

a trailer backup assist control module coupled to the a trailer backup steering input apparatus and configured for determining vehicle steering information as a function of the trailer path curvature signal; and a power-steering assist system coupled to a trailer angle detection apparatus, the trailer backup steering input apparatus, and the trailer backup assist control module, the power-steering assist system includes a control module structure configured for generating power steering system control information as a function of the trailer angle detection apparatus signal and the backup steering input apparatus signal and controlling steering of steered wheel of the vehicle as a function of the vehicle steering information.

34. The system of claim 33 wherein determining the vehicle steering information includes:

determining a jackknife angle for the system; and determining a steering angle for the steered wheels of the vehicle required for limiting a potential for the system achieving the jackknife angle.

35. The system of claim 34 wherein he kinematical information utilized in determining the jackknife angle includes:

a maximum steered angle for steered wheels of the vehicle;

a wheel base dimension of the vehicle;

a rear axle-to-hitch rotation point for the vehicle; and an axle-to-hitch rotation point for the trailer.

36. The system of claim 33 wherein the trailer backup steering input apparatus further includes at least one of:

a visual indicator being selectively activated to provide notification of an unacceptable trailer backup condition;

an audible indicator being selectively activated to provide notification of the unacceptable trailer backup condition; and a tactile indicator being selectively activated to provide notification of the unacceptable trailer backup condition.

37. The system of claim 33 wherein the knob movement sensing device signal outputted when the knob is in a position other than the at-rest position corresponds to a curvature of a path of travel of the trailer over which the trailer travels while being backed by the vehicle.

38. The system of claim 37 wherein:

a first one of the opposing rotational ranges of motion is substantially equal to a second one of the opposing rotational ranges of motion; and a change in curvature of the path of travel of the trailer varies as a function of the amount of rotation of the knob.

39. The system of claim 38 wherein a force biasing the knob toward the at-rest position increases as a function of the amount of rotation of the knob with respect to the at-rest position.

40. The system of claim 33 wherein a force biasing the knob toward the at-rest position increases as a function of the amount of rotation of the knob with respect to the at-rest position.

* * * * *